(12) United States Patent
Judd et al.

(10) Patent No.: US 7,412,291 B2
(45) Date of Patent: Aug. 12, 2008

(54) GROUND-BASED SOFTWARE TOOL FOR CONTROLLING REDUNDANCY MANAGEMENT SWITCHING OPERATIONS

(75) Inventors: Thomas D. Judd, Woodinville, WA (US); Michael J. Kayser, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 576 days.

(21) Appl. No.: 10/905,608

(22) Filed: Jan. 12, 2005

(65) Prior Publication Data
US 2006/0156053 A1    Jul. 13, 2006

(51) Int. Cl.
G05B 11/01    (2006.01)
G06F 11/00    (2006.01)

(52) U.S. Cl. ............................................ 700/21; 714/6
(58) Field of Classification Search .................. 700/21, 700/82; 714/2, 5, 6, 11; 701/43
See application file for complete search history.

(56) References Cited

U.S. PATENT DOCUMENTS

| | | | |
|---|---|---|---|
| 5,781,716 A | 7/1998 | Hemphill et al. | |
| 5,996,086 A * | 11/1999 | Delaney et al. | 714/4 |
| 6,622,261 B1 | 9/2003 | Laranjeira et al. | |
| 6,732,289 B1 * | 5/2004 | Talagala et al. | 714/6 |
| 6,823,477 B1 * | 11/2004 | Cheng et al. | 714/26 |
| 6,901,531 B2 * | 5/2005 | Gilbert et al. | 714/5 |
| 6,952,792 B2 * | 10/2005 | Emberty et al. | 714/5 |
| 7,027,053 B2 * | 4/2006 | Berndt et al. | 345/473 |
| 7,062,676 B2 * | 6/2006 | Shinohara et al. | 714/15 |
| 7,188,273 B2 * | 3/2007 | Allen et al. | 714/6 |
| 7,225,356 B2 * | 5/2007 | Monitzer | 714/12 |
| 7,246,256 B2 * | 7/2007 | De La Cruz et al. | 714/4 |
| 2003/0105987 A1 * | 6/2003 | Gilbert et al. | 714/6 |
| 2004/0010731 A1 * | 1/2004 | Yu et al. | 714/4 |
| 2005/0010731 A1 * | 1/2005 | Zalewski et al. | 711/162 |

FOREIGN PATENT DOCUMENTS

EP    1320217 A1    6/2003
JP    2001034495    2/2001

* cited by examiner

Primary Examiner—Thomas K Pham
(74) Attorney, Agent, or Firm—McDonnell Boehnen Hulbert & Berghoff LLP

(57) ABSTRACT

Systems, methods, and computer program products for easily altering redundancy management data values associated with redundancy management logic that is executed by redundant data processing systems. The redundancy management data values are altered on a computer device remote from the system that includes the redundant data processing systems.

19 Claims, 2 Drawing Sheets

GROUND-BASED SOFTWARE TOOL FOR CONTROLLING REDUNDANCY MANAGEMENT SWITCHING OPERATIONS

BACKGROUND OF THE INVENTION

Many applications computer-controlled systems include redundant components for improved integrity and reliability. For example, in some commercial aircraft, dual Communication Management Units (CMUs) are used. One of the CMUs acts as a master CMU and the other CMU acts as a stand-by CMU. As long as all operations are working properly, the master CMU controls system operation and if the master CMU is determined outside of a threshold limit of operation, the system switches to the stand-by CMU. Likewise with other types of redundant systems, a base logic has been developed for controlling and determining which of the redundant systems are to perform the controlling operations.

In present systems, redundancy management logic is hard-coded into the system in which the redundancy management logic is used. Thus, it is difficult and time-consuming to alter the redundancy management logic or any of the logic, parameters, thresholds, time limits, or other values or code that are used by the redundancy management logic. One must directly access the redundancy management logic and the associated data and alter it line by line.

Therefore, there exists a need to allow alteration of redundancy management logic in order to make it easier for altering of redundancy management switching logic requirements on a multiple system environment.

SUMMARY OF THE INVENTION

The present invention allows for alteration of data used by redundancy management (switching) logic. The two or more redundant units share status information; then both units apply the same switching logic. The switching logic is defined in a separately loadable data base file that is created by a ground-based software tool (GBST) executed on a remote a computer device remote from the system that includes the redundant units.

The present invention makes the certification of avionics updates easier when a database/file is changed rather than actual code.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
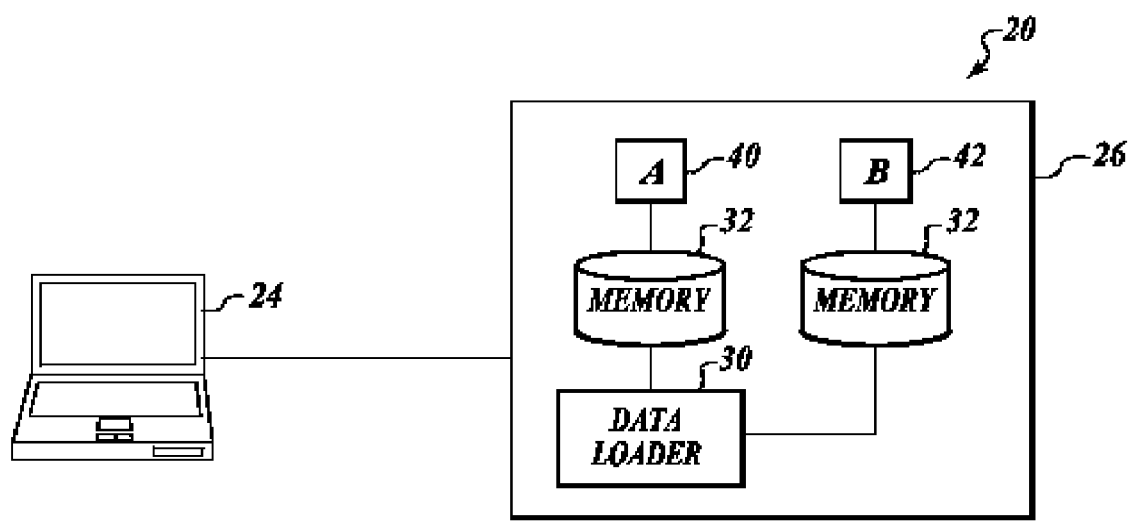
FIG. 1 illustrates an exemplary system that uses a ground-based software tool to alter data used by switching logic in accordance with an embodiment of the present invention.

FIG. 1 illustrates an example system 20 that allows one to easily update or alter redundancy management functionality. The system 20 includes a computer system 24 and at least two redundant subsystems 40 and 42 and associated memory 32. The computer system 24 executes a user interface software tool (ground-based software tool (GBST)) that allows a user to change data associated with or used by redundancy management (switching) logic that is executed by the redundant subsystems 40 and 42 of the system 26. Once the user has changed the data within the computer system 24, the new data is sent to the system 26 and stored within the memory 32. The redundant subsystems 40 and 42 control operation of according to the redundancy management logic and the new data stored in the memory 32. Each redundant subsystem 40 and 42 includes its own memory 32.

The user interface software tool that is executed by the computer system 24 for altering the data (stored in the memory 32 of the system 26) may be used to change data that is used in any system that includes redundant processing systems, such as factories, ships, aircraft, etc. Examples of redundant systems within an aircraft include any of the number of redundant avionic systems, such as communication management unit, (CMUs), an airplane information management system (AIMS), flight management computers (FMCs), or redundant radios (e.g., Satellite Data Unit (SDU)).

In one embodiment, a file is created on the computer system 24. Then the file is stored on a removeable memory device, such as a compact disc, floppy disc, memory card, or other data storage device. The memory device is inserted into an on-board data loader 30 that loads the stored file into the memory 32.

In another embodiment, if the system 26 is an aircraft and the computer system 24 is a laptop or palmtop computer that can be brought directly to the aircraft. The laptop or palmtop computer is wirelessly or wire-linked to the memory 32 for downloading altered redundancy management data. The laptop or palmtop computer utilizes a ground-based software tool formed in accordance with an embodiment of the present invention for altering the redundancy management data.

Figure 2:
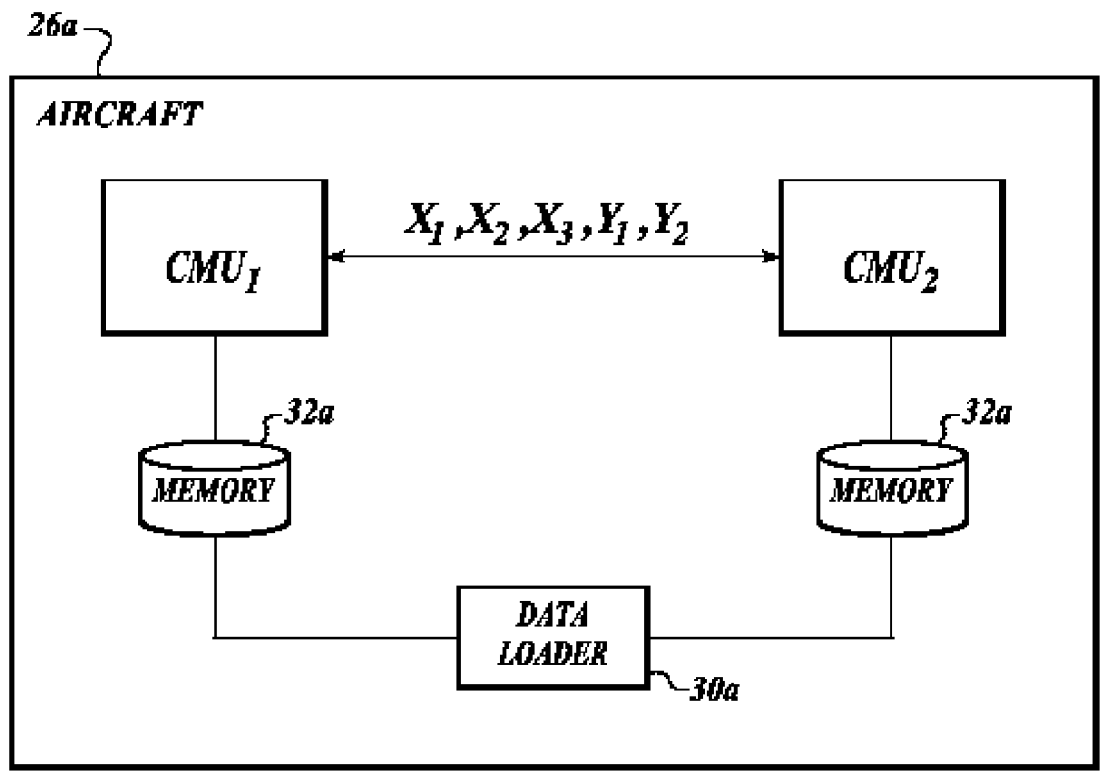
FIG. 2 illustrates a block diagram of an exemplary redundancy management system that is affected by the ground-based software tool that is formed in accordance with an embodiment of the present invention.

FIG. 2 illustrates an aircraft 26a that includes redundant CMUs ($CMU_1$ and $CMU_2$). The aircraft 26a includes a data loader 30a and memory 32a. $CMU_1$ and $CMU_2$ share all the parameter information $X_1$, $X_2$, $X_3$, $Y_1$ and $Y_2$. X parameters are based on monitoring external devices and Y parameters are internal parameter status. In this embodiment, each redundant system ($CMU_1$ and $CMU_2$) performs the following algorithms (i.e., redundancy management logic) in order to determine which CMU should be master and which CMU should be stand-by. In this embodiment, $CMU_1$ acts initially as the master and $CMU_2$ acts initially as the stand-by.

$$CMU_1 = a_1X_1 + a_2X_2 + a_3X_3 + a_4Y_1 + a_5Y_2 = R_1 \quad (1)$$

$$CMU_2 = a_1X_1 + a_2X_2 + a_3X_3 + a_4Y_1 + a_5Y_2 = R_1 \quad (2)$$

Threshold=Q
$T_1$=R (Time)
$T_2$=S (Time)
If $T_2$ expires:
  If the following exist for Time $T_1$:
    $R_1-R_2>Q$, then $CMU_1$ should be master;
    $R_2-R_1>Q$, then $CMU_2$ should be master;
    $|R_1-R_2|<Q$, then don't switch.

The parameters $X_N$ and $Y_N$ may represent various parameters important to the operation of the CMUs, such as satellite communication availability, VHF communication availability, HF communication ability, Aeronautical Telecommunications Network (ATN) status, etc. In this example, time $T_1$ indicates how long a "switch condition" (i.e., [R1–R2>Q] or [R2–R1>Q]) must exist before allowing the switch to happen and $T_2$ identifies how long after a switch occurs before the analysis performed above is re-executed.

Figures 3, 4:
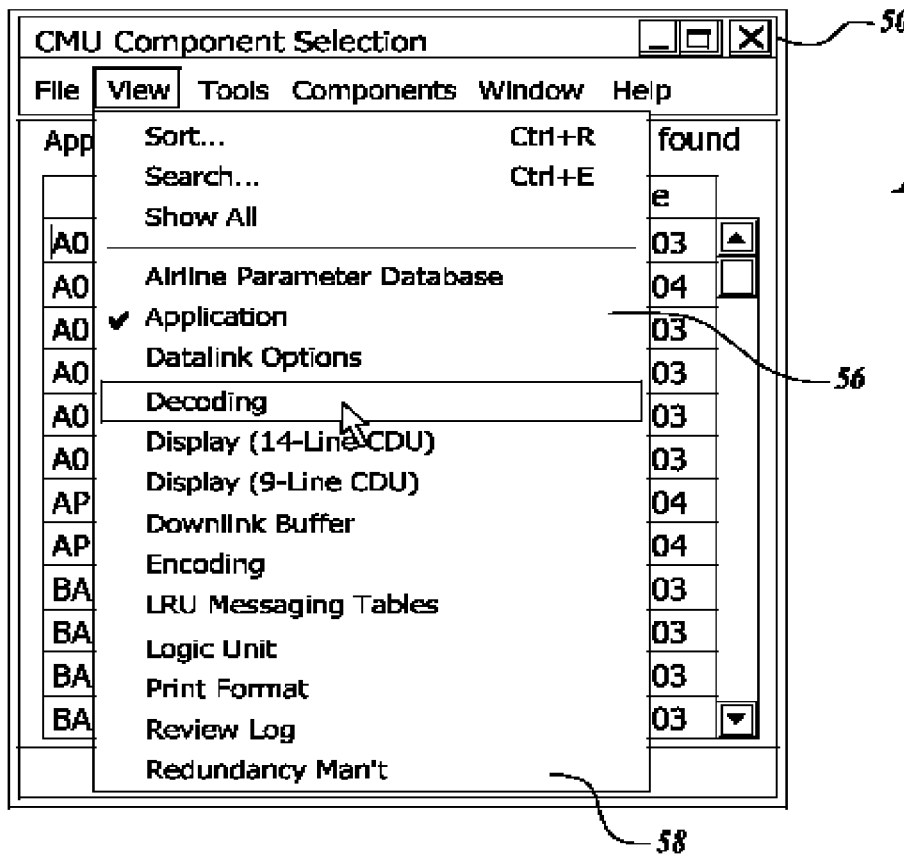
FIG. 3 illustrates a screenshot of a ground-based software tool formed in accordance with an embodiment of the present invention.
FIG. 4 illustrates an example table that includes items that users may alter using the ground-based software tool as shown in FIG. 3.

FIG. 3 illustrates a screenshot of a user interface window 50 that is generated by a ground-based software tool and presented to a user at the computer device 24. The window 50 includes a pull-down view menu 56 that provides a user various selections for altering data or functions that are to be stored within the memory 32a of the aircraft 26a. One of the selectable items in the pull-down menu 56 is a redundant management function item 58. When the user activates the redundant management function item 58 in the pull-down menu 56, the user is presented with editable tables as shown in FIGS. 4 and 5.

As shown in FIG. 4, a table 66 includes a column of parameters and a column of associated weight values. In this example, a user might be allowed to alter the weight values $a_1$-$a_5$. A user can alter redundancy management operation just by altering $a_1$-$a_5$, thus changing the weight values $R_1$ and $R_2$ as shown in the Equations 1 and 2. The table also includes time values $T_1$ and $T_2$ and a threshold value Q. A user may also alter these values, thus changing the execution of the example redundancy management logic that is shown above. The entries in the tables may also include logic functions instead of just data.

Once the user has changed any of the values from the table 66, the user can generate a loadable file that is stored on a removable storage device, which indicates to the software the altered values, or selects a save function that saves the altered values. At that time or at some later time, the user uploads the newly saved table 66 into the memory 32a of the aircraft 26a, thus replacing the values stored within the memory 32a with the values that are in the newly saved table 66. If the loadable file was stored on a removable storage device, the on-board data loader receives the removable storage device and removes or copies the file to the memory 32a.

Certain users may not be allowed access to alter some of the redundancy management data. For example, a manufacturer of the redundancy management control logic may have unlimited access to alter the redundancy management data. However, airline maintenance personnel may be allowed to alter only a portion of the redundancy management data based on predefined restrictions.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A system comprising:
   a device comprising:
   at least two data processing systems arranged to perform redundant operations, wherein at least one of the at least two data processing systems serves as a master;
   control logic arranged to determine which of the at least two data processing systems is a master; and
   memory arranged for storing data values used by the control logic to determine which of the at least two data processing systems is a master; and
   a computer configured to execute a ground based software tool, wherein the ground-based software tool includes a component configured to allow a user to change at least one of the stored data values used by the control logic to determine which of the at least two data processing systems is a master.

2. The system of claim 1, wherein the data values include weight values.

3. The system of claim 1, wherein the data values include time limit values.

4. The system of claim 1, wherein the data values include switching threshold values.

5. The system of claim 1, wherein the data values include weight values, time limit values, and switching threshold values.

6. The system of claim 1, wherein the device is an aircraft.

7. The system of claim 6, wherein the at least two redundant data processing systems include communication management units.

8. The system of claim 1, wherein the device is a communication system.

9. The system of claim 1, wherein the computer stores data values on a removable storage device, the device further includes a data loader for receiving the removable storage device and storing the data values on the storage device into the memory.

10. A method comprising:
    altering at least one redundancy management data value associated with redundancy management logic at a computer;
    saving the altered data value on a removable storage device;
    sending the at least one altered redundancy management data value from the removable storage device to memory included in an apparatus, wherein (1) the apparatus includes at least two data processing systems, (2) at least one of the at least two data processing systems serves as a master, and (3) the at least two data processing systems perform redundant operations and execute redundancy management based on the one or more redundancy management data values stored in the memory; and
    using the at least one altered redundancy management data value to determine which of the at least two data processing systems serves as a master.

11. The method of claim 10, wherein the redundancy management data values include weight values.

12. The method of claim 10, wherein the redundancy management data values include time limit values.

13. The method of claim 10, wherein the redundancy management data values include switching threshold values.

14. The method of claim 10, wherein the redundancy management data values include weight values, time limit values, and switching threshold values.

15. The method of claim 10, wherein the apparatus is an aircraft.

16. The method of claim 15, wherein the at least two redundant data processing systems include communication management units.

17. The method of claim 10, wherein the apparatus is a communication system.

18. The method of claim 10, further comprising:
    receiving the removable storage device at a data loader of the apparatus; and
    storing the data values on the storage device into the memory.

19. The method of claim 10, wherein the at least one redundancy management data value includes weight values, time limit values, and switching threshold values.

* * * * *